United States Patent [19]

Taylor

[11] 4,012,958
[45] Mar. 22, 1977

[54] FLOWMETER

[76] Inventor: Lionel Ivor Taylor, Copythorne House, Copythorne, Southampton, England

[22] Filed: Dec. 9, 1975

[21] Appl. No.: 639,115

[52] U.S. Cl. .................................. 73/231 R; 73/113
[51] Int. Cl.² .......................................... G01F 1/10
[58] Field of Search ............. 73/231 R, 113, 194 E

[56] References Cited

UNITED STATES PATENTS

| | | | |
|---|---|---|---|
| 2,299,406 | 10/1942 | Potter | 73/231 R X |
| 2,326,169 | 8/1943 | Piquerez | 73/231 R |
| 3,135,116 | 6/1964 | Kwong et al. | 73/231 R |
| 3,563,090 | 2/1971 | Deltour | 73/194 E |

FOREIGN PATENTS OR APPLICATIONS 960,862  3/1957  Germany ..................... 73/231 R Primary Examiner—James J. Gill
Attorney, Agent, or Firm—Emory L. Groff, Jr.

[57] ABSTRACT

A flowmeter, particularly for measurement of fuel flow rates to engines having a bore within a body with axially disposed inlet and outlet parts, a rotor in the bore with a hub carrying helical vanes substantially filling the cross-section of the bore and a light source with an associated photo responsive device arranged so that the vanes of the rotor interrupt the light beam to produce an electrical output signal with a frequency component proportional to the speed of rotation of the rotor.

3 Claims, 5 Drawing Figures

FLOWMETER

BACKGROUND OF THE INVENTION

This invention relates to a flowmeter by which the flow of a fluid medium in, for example, a pipeline may be represented by an electrical signal, the electrical signal bearing a relationship to the rate of flow of fluid. The invention is particularly concerned with fuel flowmeters for engines.

By fluid is meant generally a liquid but the term can include also a vapour or gas.

In known constructions of flowmeters where the fluid flow rate varies over a wide range problems are encountered in providing for reliable consistent indication at low rates of flow. Temperature changes further affect the viscosity of the fluid and dimensions of the flow channel leading to variations. Flowmeters used in motor vehicle or water craft must further operate reliably and accurately over a long period and must be resistant to corrosion and chemical attack not only from the fuel but also from any additives therein. Known constructions of flowmeter have not fully met these requirements and have proved to be unreliable when used for fuel consumption measurement in motor vehicles.

An object of this invention is to provide a flowmeter which will have improved response to low fluid flow rates and which will provide an electrical output signal having a frequency proportional to flow. A further object is to provide improved temperature characteristics and resistance to corrosive effects over a long period of use.

SUMMARY OF THE INVENTION

According to this invention, there is provided a flowmeter with a body having an axial bore with a rotor mounted therein and comprising a hub with helical vanes adapted to be rotated by fluid passing through the bore, the vanes of the rotor interrupting a tangentially directed beam of light, the light being detected by a photo-sensitive device to produce an output signal proportional to the rate of rotation of the rotor. The frequency of the detected light thus corresponds to the rate of flow of the fluid medium and may be processed to a pulse-like or other form to serve as an indication of the flow rate.

A preferred application of the flowmeter, according to the invention, is in a fuel consumption meter for motor vehicles. In one such device it is necessary to produce a signal proportional to the speed of the vehicle and another signal proportional to the rate of fuel consumption, these two signals then being electrically processed to produce a third signal representing miles-per-gallon at any instant. In such a device the signal representing the vehicle speed may be obtained from the vehicle speedometer. The signal representing the fuel flow rate may comprise pulses derived from the photo-sensitive device of the flowmeter according to this invention. The two signals are processed electrically to produce the required function of distance travelled per unit of fuel.

The photo-sensitive device may comprise a means capable of producing an electric signal in response to light such as a photo-voltaic cell or capable of producing a change in an electrical circuit in response to light such as a photo-conductive cell providing the speed of response of the device is sufficiently great at the highest frequency expected in use. The device may comprise a photo-transistor.

The rotor is preferably housed within a transparent or translucent body which also defines the axial bore through which the fuel flows. On one side of the body a light source is provided and on the other side of the body a photo-sensitive device is mounted. The vanes, partially at least, obscuring the path between the light source and photo-sensitive device periodically during rotation of the rotor.

One rotor only may be used but preferably two rotors are provided and a fixed flow correcting vane assembly located therebetween. The bore is advantageously defined by a glass tube housed within the body which is opaque and provided with an aperture at the location of the light source and photo-sensitive device.

In one specially advantageous arrangement the body is arranged to form a lens structure to produce a focussing of the light beam.

The flowmeter according to the invention has excellent sensitivity achieved by the helical vanes and low friction bearing arrangement and the inclusion of the glass tube provides a precision diameter bore free from corrosive effects and changes due to temperature.

BRIEF DESCRIPTION OF THE DRAWINGS

The invention will be further described in conjunction with the accompanying drawings showing preferred embodiments and modifications. In the drawings.

DESCRIPTION OF THE PREFERRED EMBODIMENTS

Figure 1:
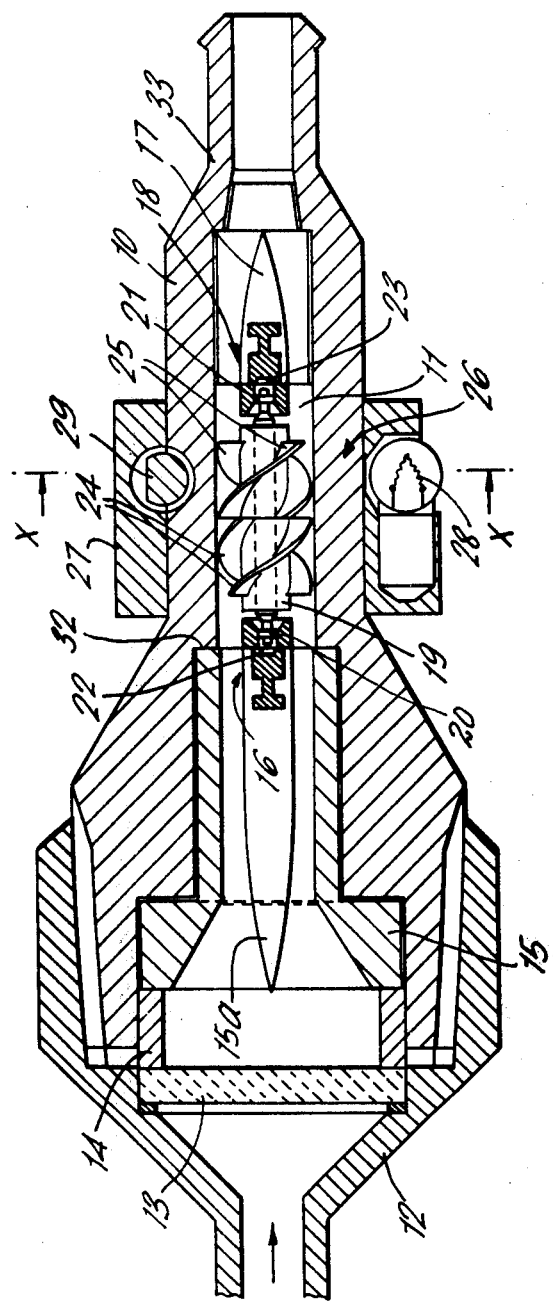
FIG. 1 is a longitudinal section through one version of the flowmeter.
Figure 2:
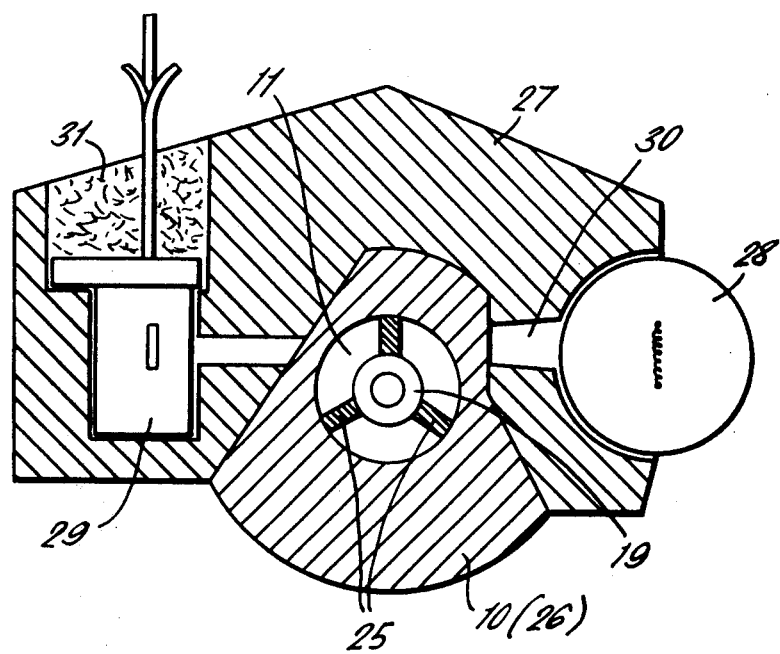
FIG. 2 is a cross section on the line X — X of FIG. 1.
Figure 3:
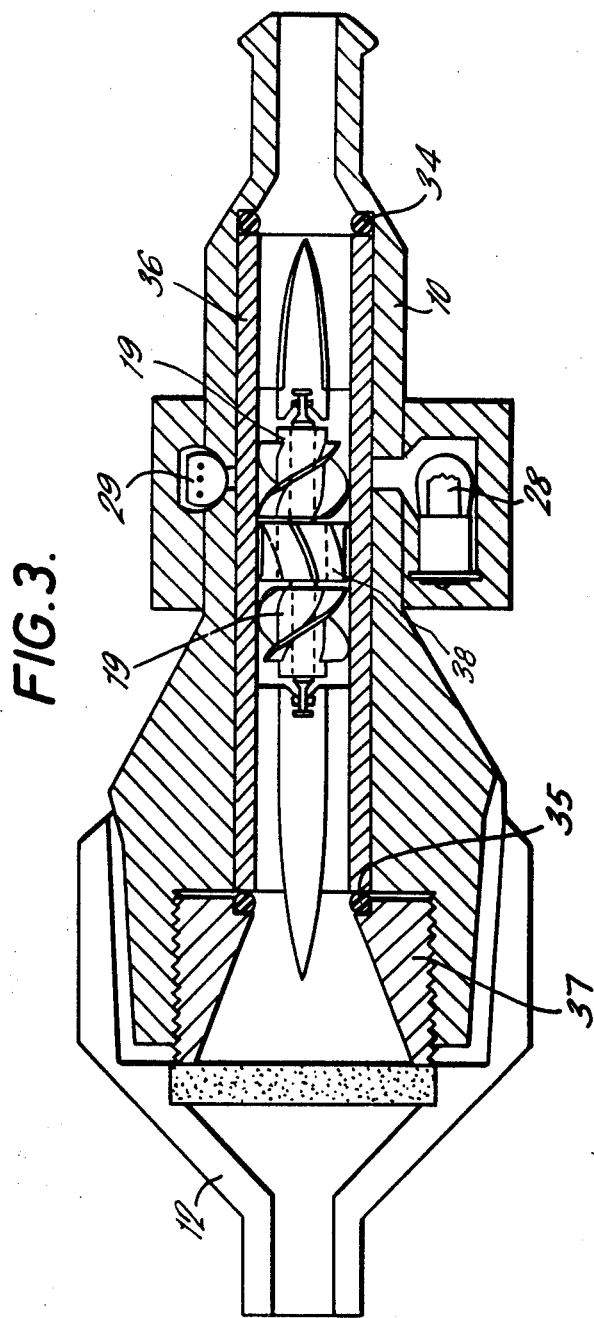
FIG. 3 is a longitudinal section through a second version of a flowmeter.

As shown in FIGS. 1 to 3, the flowmeter comprises a body part 10 of, for example, nylon which defines an axial bore 11 for the fluid medium. The fluid medium enters through an end cap 12 which is screw connected with the body 10 and which retains a sintered bronze filter 13, a synthetic rubber sealing ring 14, and a first body insert 15. The body insert carries an axially located flow straightener 15a in an end of which is inserted a bearing assembly 16. Downstream of the first insert 15 is a second insert 17 having a similar bearing assembly 18. A rotor 19 is disposed between the two inserts 15 and 17 and is mounted to be freely rotatable in the bearing assemblies.

The bearing assemblies 16 and 18, may include sapphire rings 20 and 21 in which a hardened steel shaft at each end of the rotor runs. The rotor is located longitudinally by sapphire end thrust surfaces 22, 23.

The rotor includes a hub which carries the steel bearing shafts and two sets of spiral vanes 24 and 25 which are axially offset with respect of one another as shown. Each set includes three vanes and the purpose of the axial offset of the vanes is to increase the coupling to the fluid flow.

The body 10 is formed from translucent or transparent plastics material or at least the part 26 of the body 10 is formed from such a material.

A saddle 27 is located over the body 10 in the region 26 of the rotor and carries at one side a light source 28, such as a bulb and at the other side a photo-responsive device 29, such as photo-transistor. The saddle is formed from an opaque plastics material and includes a passageway 30 (FIG. 2) forming a light transmissive path between the bulb 28 and photo-transistor 29. The passageway 30 is so aligned that the light is obscured, partially at least, by the vanes 25 cyclically as the rotor rotates, the cyclic interruption being detected by the photo-transistor 29.

The photo-transistor 29 is embedded within the saddle 27 and may be retained by a filler material 31, through which leads to the photo-transistor pass.

It has been found in practice that when the body 10 is formed from a semi-opaque material, such as I.C.I. "Maranyl" B-100 nylon, then sufficient light is passed for the photo-transistor to respond to the rotation of the rotor.

Where the fluid being measured is a liquid, the difference in refractive index produces the effect of a bi-convex lens when a beam of light shines through the body. This property can be used to advantage by suitable positioning to focus the light beam onto the photo-sensitive device to produce a more intense signal. A tungsten filament lamp operating at a lower than rated voltage or a light emitting diode may then be used.

In the assembly of the flowmeter described the internal parts are inserted from the left-hand side of FIG. 1 and the body inserts 15a and 17 are located by abutment against respective shouldered portions 32 and 33 formed in the pathway 11 of the body 10. The distance between the shoulders 32 and 33 defines the distance between the bearing assemblies carrying the rotor. The body inserts are a push-fit in the body 10.

The modified flowmeter of FIG. 3 is generally similar to that described but includes a precision-bore glass tube 36 of a boro-silicate glass as a lining for the bore which is retained within the body 10 by a plug 37 and two sealing O-rings 34 and 35. The body 10 is of an opaque plastics material such as glass loaded nylon or acetal providing a low coefficient of expansion. Between the two rotors 19, mounted on a common shaft, fixed vanes 38 are provided. The angle of the vanes 38 is arranged so as to correct the swirl imparted to the fluid by the upstream rotor thus enabling the second rotor to use more fully the energy available from the fluid at very low flow rates.

In this version the lamp saddle assembly is not used as the apertures for the lamp 28 and photo-transistor 29 can be provided in the moulding of the body 10.

Figure 4:
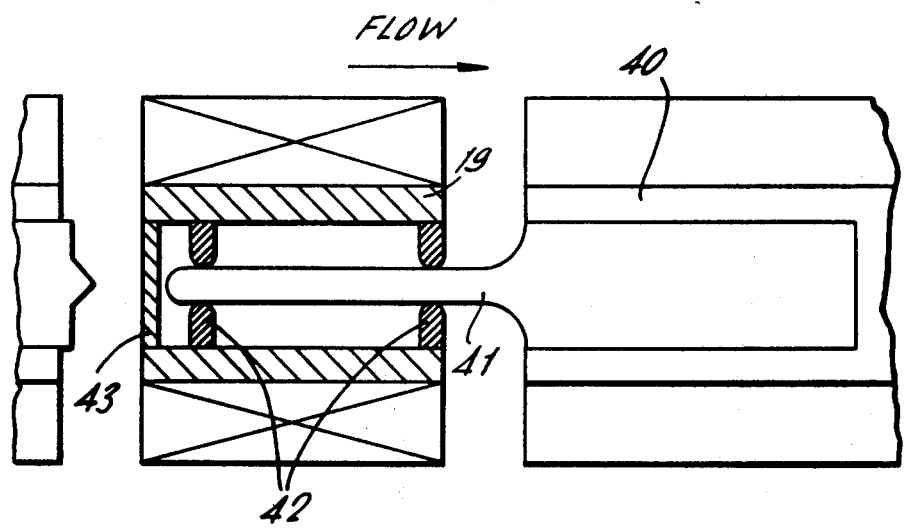
FIG. 4 is a detail of a modified rotor mounting.
Figure 5:
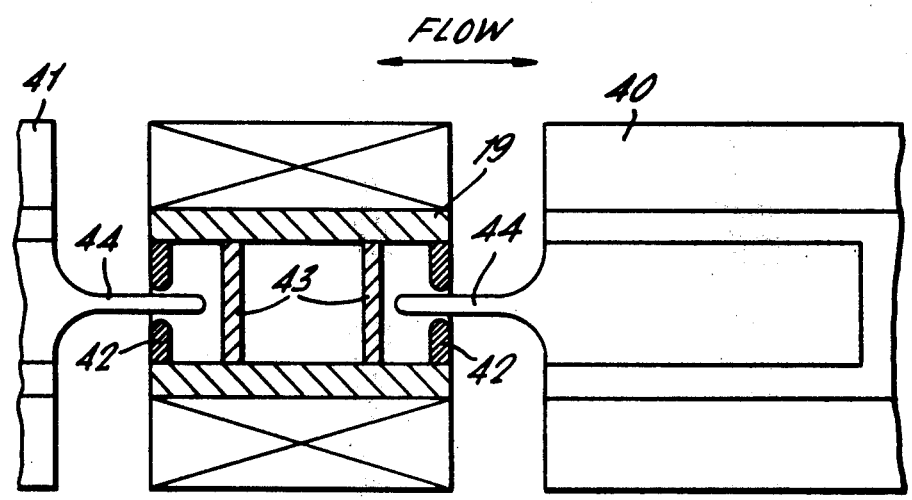
FIG. 5 shows a further rotor mounting arrangement.

FIGS. 4 and 5 show modified mounting arrangements for the rotor or rotors 19. In FIG. 4 an insert 40 downstream of the flow has a hardened steel axle 41 and the rotor includes sapphire rings 42 with a sapphire thrust bearing 43. In FIG. 5 two inserts 40, 41 are provided both with axles 44. The rotor 19 having sapphire bearing rings 42 and thrust bearings 43 for each axle. In this case the fluid flow may be in either direction.

The bearings may be of a low friction plastics material such as an acetal copolymer or homopolymer.

I claim:

1. A fluid flowmeter, particularly for use with a specified fuel for measuring the rate of flow thereof to an engine, said flowmeter including a tube with an inlet and outlet for connection with the fuel pipe-line, a rotor mounted for rotation within the tube by bearing assemblies, the rotor including helical vanes extending along its length and substantially filling the cross-section of the bore of the tube, a light source and a photo-responsive device disposed on opposed sides of the tube whereby a light beam is cyclically interrupted by the vanes of the rotor to produce an output signal having a component of frequency proportional to the rate of rotation of the rotor, characterized by:
   a. a body surrounding and supporting said tube over substantially its whole length,
   b. said tube being of a transparent glass,
   c. the light-source and photo-responsive device being positioned in relation to the tube so that, with the specified fuel, the tube acts in the manner of an optical bi-convex lens to converge the light beam,
   d. said body including apertures for passage of the light,
   e. said body being integral with means carrying the light source and photo-responsive means.

2. A fluid flowmeter as claimed in claim 1 further characterized by the axes of the aperture in the body being offset along a transverse plane through the tube, the amount of offset being set to effect optimum convergence and focussing of the light beam.

3. A fluid flowmeter as claimed in claim 2, further characterized by the rotor including annular journal bearings to receive a spigot forming an axle and carried by a fixed insert in the tube.

* * * * *